and particularly in providing a wax coating for milk containers of improved ability to prevent leaking of the container even under adverse conditions.

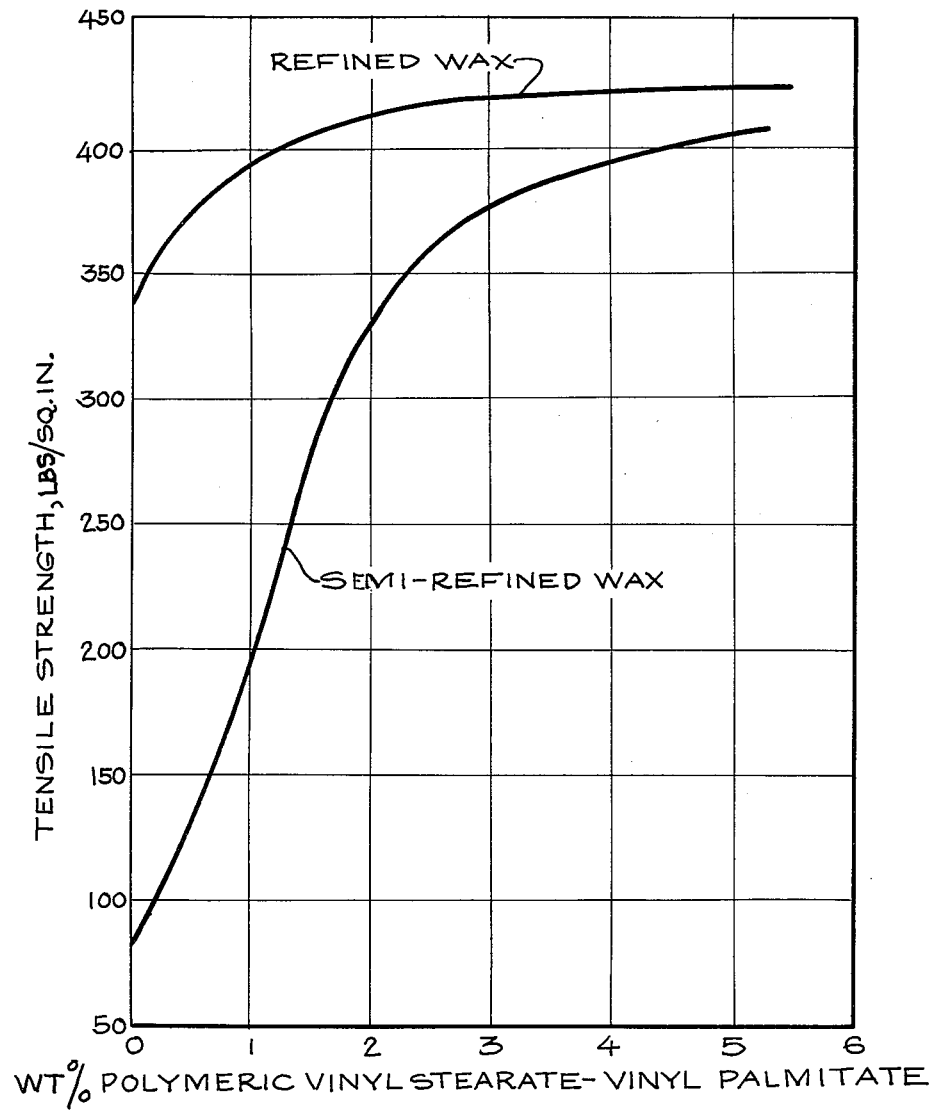

3,100,196
PETROLEUM WAX-POLYMERIC VINYL ESTER COATING COMPOSITIONS AND METHOD FOR PREPARING SAME

Roy T. Edwards, Cold Spring Harbor, N.Y., assignor to Socony Mobil Oil Company, Inc., a corporation of New York
Filed Jan. 27, 1959, Ser. No. 789,325
3 Claims. (Cl. 260—28.5)

This invention relates to petroleum wax compositions of improved properties for use in coating paper and particularly relates to the coating of dairy cartons or milk containers.

A large variety of wax compositions have been prepared for use in coating paper and paperboard. The natural petroleum waxes obtained from wax distillates or the heavier cuts of wax containing petroleum stocks have not provided a wax coating material meeting all the requirements of the paper coating industry. Vast improvement has been made in the coating of wax by improved refining techniques and a careful selection of various wax stocks, but such improved waxes fail to satisfy to the desired extent the requirement of insuring an effective vapor and liquid seal. This has been particularly true in the use of wax as a coating for milk containers or cartons. Because of rough handling, perhaps, or difficulties in applying the wax to the paper, or in the formation of the cartons, some of the cartons leak and this, of course, is exceeding undesirable. The search for a wax composition that would prevent leakage under the more rigorous conditions enumerated above has continued.

The wax most generally employed, at least as the major constituent, is paraffin wax having a melting point between about 120–150° F. The selected wax stock is chilled and mixed with suitable solvents such as liquefied propane, petroleum naphtha, methyl ethyl ketone, etc. The mixture is filtered to remove the wax from the oil and the solvent is removed from the wax. This wax is termed slack wax and still contains about 10–40 percent of oil. The slack wax is then treated to effect further removal of oil, usually in conventional sweating operations, producing a crude scale or semi-refined wax having an oil content of about 0.5–3 percent. By more precise re-sweating operations or crystallization from suitable solvents, the wax is converted to a fully refined wax having an oil content of less than 0.5 percent, usually 0.1–0.3 percent. It will be readily appreciated that the improvement of the wax from slack wax to crude scale wax or semi-refined and refined wax increases the cost of manufacture of the wax. Further, the removal of the last 1 or 2 percent of the oil is the most difficult and costly. It is, therefore, highly desirable to provide a paper-coating wax without requiring the substantially complete removal of the oil from the wax.

Wax has been used extensively heretofore in the manufacture of candles. In order to improve various characteristics of the candles, addition agents have been tried. For example, stearic acid has been added to improve the color, yielding a whiter candle. Also, agents have been added to the wax to provide a cleaner burning candle. But, unfortunately, these addition agents do not provide the improvements required of a paper-coating wax and a knowledge of these additives has not been useful in determining desirable wax mixtures for use in coating papers, In the manufacture of a candle the wax material must be strong enough to stand upright without droop, readily melted about the wick and easily burned without smoke or odor. The wax should present a white appearance and the wax must be soft enough to provide a smooth, glossy exterior. The appearance of the surface of the candle is particularly important and several addition agents have been used to blend with the wax to prevent brittleness and provide a soft exterior coating which is smooth and reflective. In the development of a wax composition suitable for coating papers and particularly milk containers, entirely different properties are required since the conditions of use are quite different. The wax must be strengthened and particularly the tensile strength of the composition must be improved.

This invention is based on the discovery that including a limited amount of a polymeric vinyl ester of organic acids having at least eight carbon atoms in the fatty acid chain with a petroleum wax will provide a wax of substantially improved tensile strength and that when this wax combination is applied to milk carton stock, an improved container is provided, less prone to leak even under adverse conditions. The invention has an additional facet in that the addition of these polymeric vinyl esters in the required amount has been found to provide a strong wax coating suitable for milk containers even when a substantial amount of oil is present in the wax. It has previously been necessary to provide a wax substantially free of oil, such as a fully refined wax of about 0.2 percent oil, for use in coating milk cartons. The presence of any substantial amount of oil was found to so reduce the tensile strength of the wax as to make the wax unsuitable for use under the rigorous conditions of operation found in coating of milk containers. But this invention provides that final oil removal steps which are costly and time-consuming can be dispensed with since petroleum wax with as much as 3 percent oil can be successfully brought up to the required tensile strength with the proper addition of polymeric vinyl ester.

The compositions used in this invention are those having:

(a) From about 95 to about 99.5 percent by weight of a crude scale or semi-refined or refined grade of paraffin wax. Such waxes have a melting point from about 120° F. to about 150° F. as determined by the ASTM Method D-87-42.

(b) From about 0.5 percent to about 5 percent of a polyvinyl ester having the formula:

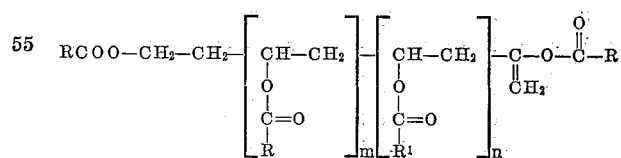

in which R and R¹ are alkyl radicals having between 8 and 24 carbon atoms in the hydrocarbon chain and $m$ and $n$ are integers, the sum of $m+n$ being between about 10 and about 1000 depending upon the molecular weight of the radicals R and R¹.

The paraffin waxes used may contain, in addition to the paraffin wax, relatively small amounts of microcrystalline wax. In general, microcrystalline wax may be present in amounts of less than about 15 percent by weight of the total wax. The presence of this wax is, of course, not necessary to the invention, all the useful results of the invention being obtained regardless of the presence or absence of this wax. The wax may contain up to about 3 percent oil and still be acceptable as a dairy carton wax provided the required amount of the polymeric vinyl esters of this invention are added. It is, therefore, generally desirable to eliminate the final oil removal steps in the preparation of the wax, these steps being the most expensive and time-consuming steps in the preparation of the wax.

It is an object of this invention to provide an improved coating composition for milk containers.

It is a further object of this invention to provide an improved milk container coating having improved strength characteristics.

It is a further object of this invention to provide a strong coating on milk containers with reduced effort and expense.

It is a further object of this invention to provide a strong coating for milk containers without requiring the substantially complete removal of oil from the coating wax.

It is a further object of this inveniton to provide an improved wax-coated paperboard having excellent characteristics for use as a milk container.

Other objects and advantages will be apparent from the following description of the invention.

Various waxes such as vegetable, animal or petroleum waxes are available as articles of commerce. This invention is related only to the petroleum waxes and, further, to those petroleum waxes found to have desirable characteristics for coating paper and particularly paperboard used to make cartons for milk and the like. The particular waxes used for this purpose are carefully selected from the various crudes available, being primarily those paraffin waxes having adequate tensile strength, predominantly normal in structure, and having a melting point of about 120–150° F. The properties of this selected wax are enhanced for use as a coating composition by addition thereto of selected amounts of the polymeric vinyl esters of this invention. The polymeric vinyl ester may be a homopolymer or a heteropolymer derived from a mixture of monomers. It is possible to have copolymerization in the formation of the esters of this invention, and these copolymers provide equally satisfactory results provided the other requirements are met. The polymeric vinyl esters of organic acids having fewer than eight carbon atoms in the chain are not readily compatible with the petroleum wax used as coating wax and exhibit a tendency to separate out of the wax composition and are, therefore, not usable as a constituent of the wax compositions of this invention. When the carbon chain becomes unduly lengthy, incompatibility with the wax again becomes pertinent and, further, other undesirable properties are encountered which make the upper limit of utility about 24, so that for purposes of this invention the carbon chain is limited between about 8 and about 24. A particularly preferred compound involves polymer of a mixture of vinyl stearate and vinyl palmitate units being about 70 percent by weight vinyl stearate and about 30 percent vinyl palmitate. The average molecular weight of the polymeric vinyl ester may range from about 3,000 to about 300,000 as measured by the Staudinger method (see T. E. McGoury and H. Nash report in A. Weissberger, Physical Methods of Organic Chemistry, Chapter VIII, second edition). It is only required that the acid portion of the vinyl ester be chosen to provide good compatibility with the wax. In general, as the molecular weight of the polymeric vinyl ester increases, more of the polymer is required to improve the tensile strength. The polymeric vinyl esters have a limited compatibility with petroleum wax with the high molecular weight polymers being more limited in this respect than the lower molecular weight material. The increase in tensile strength of the wax blend to be obtained by the addition of polymeric vinyl ester increases with increasing polymer content up to a maximum and then falls back with further addition of polymer. This critical point is in certain instances beyond the limit of compatibility of the polymer with the wax and hence the addition of polymer must be limited below the level of maximum tensile strength and further below the limit of compatibility to insure good results under all conditions encountered. The preferred polymeric vinyl esters are those having a molecular weight of about 5,000–90,000 (Staudinger method). The tensile strength of the wax blend for coating paperboard should be at least about 200 p.s.i. and preferably at least about 250 p.s.i.

The incorporation of the polymeric vinyl ester into the paraffin wax may be accomplished by simple heating of the two components above the melting point of the higher melting constituent. A temperature of about 180–200° F. is generally found satisfactory, although in some cases substantially higher temperature may be required to bring the components into a suitable solution. In such instances when solution has been acquired, the mixture may be reduced in temperature to a suitable coating temperature, such as, for example, 150–175° F., without separation of the constituents. Polyethylene has previously been considered for use in dairy wax to provide improved properties and particularly improved tensile strength. The polyethylene, however, is difficult to get into solution with the wax and furthermore tends to settle out on cooling below the melting point of the polyethylene, providing a severe problem since in many instances the coating bath must be maintained at a particular temperature found suitable for applying the correct thickness of coating to the milk containers. For this reason, the use of polyethylene has been restricted to very small amounts or completely eliminated.

The paperboard or carton used for milk containers can be coated with the compositions of this invention by any of the well known procedures available in the art without complication. By way of illustration, the data gathered hereinbelow was obtained by dipping the samples of paperboard at 175° F. in a polyvinyl stearate wax blend of this invention for ten seconds, draining for five seconds, and hardening the wax coating by immersing the waxed samples in water at 70° F. In this way a satisfactory film of polymeric vinyl stearate-vinyl palmitate wax was formed on the paperboard.

The improvement of the blended wax compositions of this invention is demonstrated by tensile strength figures for different polymeric vinyl stearate-vinyl palmitate paraffin wax blends. That is, a tensile strength of a particular wax blend is an indication of the relative efficiency of that composition since the number of defective milk containers (so-called "leakers") may be considerably reduced if the mechanical strength of the wax coating is improved.

It has been found that even minor additions of a polyvinyl ester to refined, semi-refined or crude scale wax have a marked improvement upon the tensile strength of the wax composition. The effect of polymeric vinyl stearate-vinyl palmitate (average molecular weight 5,000) on a refined paraffin wax and semi-refined paraffin wax or crude scale wax is illustrated by Tables I and II. In these experiments the tensile strength was determined by the method of Padgett and Killingsworth as described in the Paper Trade Journal, volume 122, page 36 (May 9, 1946).

TABLE I

*Effect of Addition of Polymeric Vinyl Stearate-Vinyl Palmitate to Refined Wax*

| Refined paraffin wax, weight percent | Polyvinyl stearate, weight percent | M.P., A.S.T.M., °F. | Oil, A.S.T.M., percent | Tensile strength, lbs./sq. in. |
|---|---|---|---|---|
| 100   |     | 127.4 | 0.16 | 336 |
| 99.5  | 0.5 |       |      | 396 |
| 99.0  | 1.0 |       |      | 384 |
| 98.0  | 2.0 |       |      | 412 |
| 97.0  | 3.0 |       |      | 420 |
| 95.0  | 5.0 |       |      | 428 |

TABLE II

*Effect of Addition of Polymeric Vinyl Stearate-Vinyl Palmitate to Crude Scale Wax*

| Crude scale wax, weight percent | Polyvinyl stearate, weight percent | M.P., A.S.T.M., °F. | Oil, A.S.T.M., percent | Tensile strength, lbs./sq. in. |
|---|---|---|---|---|
| 100   |     | 129.0 | 1.71 | 80  |
| 99.5  | 0.5 |       |      | 128 |
| 99.0  | 1.0 |       |      | 192 |
| 98.0  | 2.0 |       |      | 336 |
| 97.0  | 3.0 |       |      | 376 |
| 95.0  | 5.0 |       |      | 404 |

From the results set out in Tables I and II above, it will be observed that a substantial improvement is obtained by the first 0.5 percent added and that substantially maximum improvement is reached by the addition of about 5.0 percent of the polymeric vinyl ester. Additions greater than 5 percent are not desired since other coating properties are modified, such as flexibility, resistance to blocking, color, etc. The range of about 0.5–5 percent is therefore found to provide the desired improvement in tensile strength without detrimetal effect upon other coating properties, and this range is particularly necessary to provide a preferred coating composition for milk containers. It is noted from the tables hereinabove that the presence of small amounts of oil in the wax causes a substantial softening of the wax, and for this reason only fully refined wax has been used for coating milk containers in the past. However, the addition of polymeric vinyl esters as taught by this invention seems to counteract the softening effect of the oil, causing a substantial improvement in tensile strength even with an addition of only 0.5 percent. The hardened wax can therefore be used for coating milk containers even though oil is present. It is particularly important to note, therefore, that final deoiling steps can be eliminated and semi-refined or crude scale waxes can be used as a coating wax for milk containers provided the proper amount of polymeric vinyl ester is added as indicated hereinabove. The fully refined wax has less than 0.5 percent oil, the semi-refined or crude scale wax has about 0.5–3 percent oil.

The results of Tables I and II have been plotted on the graph attached hereto, indicated as in the FIGURE.

As a further illustration of the invention, 90,000 M.W. (Staudinger method) polymeric vinyl ester was tested with varying amounts of ester in a crude scale wax having about 3.15 percent oil. The wax had an ASTM melting point of 127.4° F. The ester was a polymeric mixture of vinyl stearate and vinyl palmitate units, being about 70 percent vinyl stearate and about 30 percent vinyl palmitate. The ester had the following physical characteristics:

| | |
|---|---|
| Appearance | White wax, ground particles, 0–3/16″ dia. |
| Odor | Faint and pleasant. |
| Melting point, °C | 46–48. |
| Refractive index | 1.4562. |
| Specific gravity | 0.960–0.982. |
| Acid number | 2 max. |
| Iodine number | 5 max. |
| Hardness, ASTM,[1] cms./100 | 2.5 |

[1] Standard method of test for penetration of bituminous materials, ASTM D5–52.

The results obtained from tests of this material are shown in the following Table III:

TABLE III

| Weight percent of polymeric vinyl ester | Weight percent of petroleum wax | Weight percent of oil in petroleum wax | Tensile strength, lbs./sq. in. |
|---|---|---|---|
| 0   | 100  | 3.15 | 64  |
| 0.5 | 99.5 |      | 72  |
| 1.0 | 99.0 |      | 156 |
| 2.0 | 98.0 |      | 196 |
| 3.0 | 97.0 |      | 216 |
| 5.0 | 95.0 |      | 256 |

As a further illustration of the invention, 90,000 M.W. (Staudinger method) polymeric vinyl ester was tested with varying amounts of ester in a crude scale wax having about 2.27 percent oil. The wax had an ASTM melting point of 125.6° F. The ester was a polymeric mixture of vinyl stearate and vinyl palmitate units, being about 70 percent vinyl stearate and about 30 percent vinyl palmitate. The physical characteristics of this ester have been disclosed hereinabove. The results obtained from tests of this material are shown in the following Table IV:

TABLE IV

| Weight percent of polymeric vinyl ester | Weight percent of petroleum wax | Weight percent of oil in petroleum wax | Tensile strength, lbs./sq. in. |
|---|---|---|---|
| 0   | 100  | 2.27 | 152 |
| 0.5 | 99.5 |      | 168 |
| 1.0 | 99.0 |      | 216 |
| 2.0 | 98.0 |      | 272 |
| 3.0 | 97.0 |      | 312 |
| 5.0 | 95.0 |      | 336 |

As a further illustration of the invention, 5000 M.W. (Staudinger method) polymeric vinyl ester was tested with varying amounts of ester in a crude scale wax having about 1.04 percent oil. The wax had an ASTM melting point of 125.9° F. The ester was a polymeric mixture of vinyl stearate and vinyl palmitate units, being about 70 percent vinyl stearate and about 30 percent vinyl palmitate. The ester had the following physical characteristics:

| | |
|---|---|
| Appearance | Granular, white waxy solid. |
| Odor | Faint and pleasant. |
| Melting point, °C | 47–48. |
| Refractive index | 1.4540. |
| Viscosity | 558 centipoises at 110° C. |
| Hardness, ASTM D5–52 | 2.5. |
| Saponification No | 195–198. |
| Percent unsaponifiable matter | 0.56–0.58. |
| Acid number | 2.0. |
| Iodine number | 5.2. |
| Percent water | 0.16. |

The results obtained from tensile tests of this material are shown in the following Table V:

TABLE V

| Weight percent of polymeric vinyl ester | Weight percent of petroleum wax | Weight percent of oil in petroleum wax | Tensile strength, lbs./sq. in. |
| --- | --- | --- | --- |
| 0 | 100 | 1.04 | 76 |
| 0.5 | 99.5 | ---------- | 240 |
| 1.0 | 99.0 | ---------- | 304 |
| 2.0 | 98.0 | ---------- | 332 |
| 3.0 | 97.0 | ---------- | 328 |
| 5.0 | 95.0 | ---------- | 336 |
| ¹ 7.0 | 93.0 | ---------- | 360 |
| ¹ 10.0 | 90.0 | ---------- | 400 |
| ¹ 15.0 | 85.0 | ---------- | 392 |

¹ Solubility incomplete.

It is seen from Table V that even an exceedingly poor wax for coating purposes can be substantially improved by the addition of polymeric vinyl ester. The selected wax had a low tensile strength of 76 pounds per square inch but by ester addition this was brought up to 400 pounds per square inch. It is seen that at about 5 percent the solubility of the ester in the wax is incomplete and hence for this reason, as well as other reasons previously mentioned, the ester concentration should be limited at about 5 percent. While wax with an oil content of 0.5% by weight can be improved by the addition of polymeric vinyl ester, the improvement is particularly noticeable with wax having an oil content between 1–3% by weight and, as a result thereof, an initial tensile strength far too low for use as a coating wax. This feature is shown in the Tables III, IV and V.

It is to be understood that the compositions of this invention can contain small amounts of antioxidants of the character generally used in petroleum waxes. Sustane (a tertiary butylated hydroxanisole) and 2,6 di-tertiary butyl-4-methyl-phenol are illustrative of such antioxidants.

This application is a continuation-in-part of application, Serial Number 559,938, filed January 18, 1956, now abandoned.

I claim:

1. A container coating composition of high tensile strength comprising about 80 to about 99.5 percent by weight of a semi-refined wax having a melting point of about 120 to about 150° F. and containing about 0.5–3 percent by weight of entrained petroleum oil, and from about 0.5 to about 5 percent by weight of a solid polymer obtained by polymerizing vinyl esters of fatty acids having between 14 to 20 carbon atoms in the fatty acid chains, said solid polymer being adapted to raise the tensile strength of the semi-refined wax and having an average molecular weight of about five to ninety thousand and said coating composition being characterized by a tensile strength in excess of 200 p.s.i.

2. A container coating composition of high tensile strength comprising from about 80 to about 99.5 percent by weight of a semi-refined paraffin wax having a melting point of about 120 to about 150° F. and containing about 0.5–3 percent by weight of entrained petroleum oil, and from about 0.5 to about 5 percent by weight of a solid polymer of the mixed vinyl esters of stearic acid in major amount and palmitic acid in minor amount, said solid polymer being adapted to raise the tensile strength of the semi-refined wax and having an average molecular weight of about five to ninety thousand and said coating composition being characterized by a tensile strength in excess of 200 p.s.i.

3. A container for packaging liquids formed from fibrous sheet material and provided with an adherent coating of the coating composition of claim 2.

References Cited in the file of this patent

UNITED STATES PATENTS

| 2,020,714 | Wulff et al. | Nov. 12, 1935 |
| 2,413,239 | Manson | Dec. 24, 1946 |
| 2,595,911 | Young et al. | May 6, 1952 |
| 2,600,384 | Bauer et al. | June 17, 1952 |
| 2,600,385 | Bauer et al. | June 17, 1952 |
| 2,676,934 | Butler | Apr. 27, 1954 |
| 2,808,382 | Jakaitis | Oct. 1, 1957 |
| 2,842,508 | Sterk | July 8, 1958 |
| 2,877,196 | Reding | Mar. 10, 1959 |

OTHER REFERENCES

Bennett: "Commercial Waxes," Chemical Publishing Co., Inc., Brooklyn, N.Y. (1944), page 284.

Warth: "The Chemistry and Technology of Waxes," 2nd edition, Reinhold (1956), pages 403 and 409 relied on.

Warth: "The Chemistry and Technology of Waxes," 2nd edition (1956), page 658, published by Reinhold Pub. Corp., New York.